Aug. 5, 1947.   J. D. WEST   2,425,216
CONFORMATOR GAUGE
Filed March 16, 1944
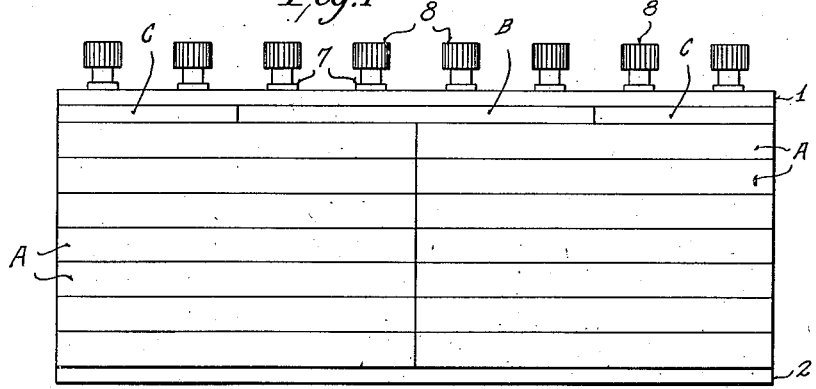
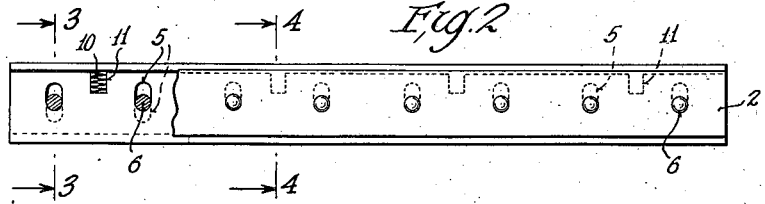
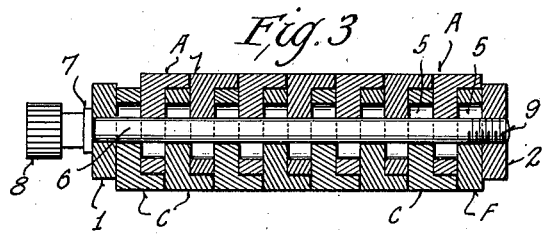
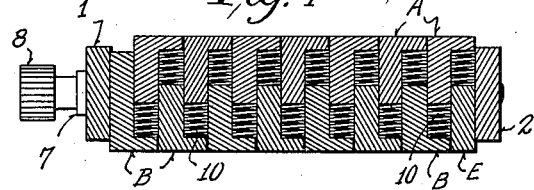
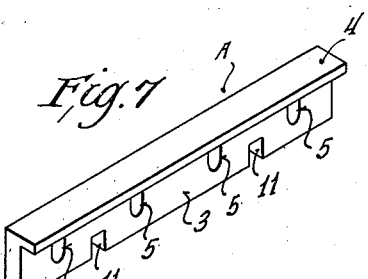
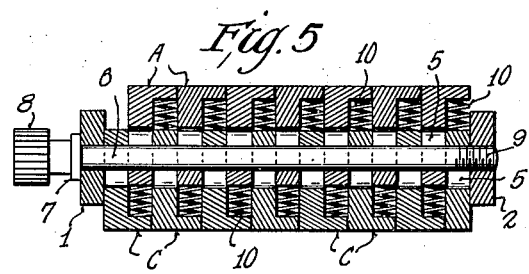
INVENTOR.
JOHN D. WEST
BY
Arthur R. Woolfolk
ATTORNEY.

Patented Aug. 5, 1947

2,425,216

UNITED STATES PATENT OFFICE 2,425,216

CONFORMATOR GAUGE

John D. West, Manitowoc, Wis., assignor to Manitowoc Shipbuilding Company, Manitowoc, Wis.

Application March 16, 1944, Serial No. 526,684

7 Claims. (Cl. 33—175)

This invention relates to gauges.

In mounting dynamos, motors, or engines or other devices of this nature on a support it is usual to place liners or shims between the support and the motor or other member. These liners are usually made in small sections eight or ten inches long and are accurately machined as close as possible to fit the space for that particular liner. They are tried in the space and the high points ground off as the fitting progresses. This is a relatively long and tedious process.

Objects of this invention are to provide a gauge which may be used to materially shorten the process of fitting liners to the space between the member to be supported and its support and to so construct the gauge that it is provided with a plurality of individually, outwardly urged members capable of independent motion so that they may accurately arrange themselves against the surfaces to be gauged on opposite sides of the gauge and may thereafter be clamped in place so that the gauge may be removed from the space and accurately calipered and thereafter the proper liner may be accurately machined or ground to the desired contour without necessitating the many successive fittings and partial grindings of the liner as has heretofore been necessary.

In greater detail, objects of this invention are to provide a gauge which is so made that it is adapted to be inserted between the opposed surfaces defining the space in which the liner is finally to be positioned and is adapted, when so inserted, to allow the release of a plurality of gauging members, the gauging members being automatically individually urged outwardly so as to accurately conform to the contour of the opposed surfaces, means being provided for subsequently clamping the members against motion so that the gauge may be removed with all of the members locked in place and accurately outlining the space to be filled by the liner.

An embodiment of the invention is shown in the accompanying drawings, in which:

Figure 1 is a plan view of the gauge.

Figure 2 is a side view of the structure shown in Figure 1, with a part broken away and parts in section.

Figure 3 is a sectional view on the line 3—3 of Figure 2.

Figure 4 is a sectional view on the line 4—4 of Figure 2.

Figure 5 is a view corresponding to Figure 3 showing the position of the gauging members when the clamping means is released.

Figure 6 is a view corresponding to Figure 1 drawn to a smaller scale and taken from the opposite side from that shown in Figure 1.

Figure 7 is a view of one of the individual gauging members removed from the remainder of the apparatus.

Referring to the drawings, it will be seen that the gauge comprises an elongated front side frame 1 and an elongated rear side frame 2. Between these side frames a plurality of gauging members are positioned. These gauging members are all elongated and are arranged in successive rows. On one side of the gauge they are preferably half the length of a row and the gauging members of this series are indicated generally by the reference character A. On the other side of the gauge the gauging members are indicated generally by the reference characters B and C. On this last mentioned side of the gauging members there are end gauging members indicated at E and F.

All of the gauging members A, B and C are similar though of different lengths. One of the gauging members A is shown in Figure 7 as illustrative. It is provided with an inwardly projecting portion indicated by the reference character 3 and with a laterally extending portion indicated by the reference character 4 which has an outer gauging face. The gauging faces of successive gauging members form a substantially continuous face on each side of the gauge. The other gauging members B and C are exactly like the gauging member A except that they are shorter, the members C being shorter than the members B. The reason for this arrangement is to have one series of members, for example A, overlap the other series of members B and C at the joints between the respective members for each of the successive rows. The members E and F, see Figure 6, do not have the extended portions 4 but have merely the portion 3 terminating in a gauging face.

Each of the several gauging members is provided with elongated slots 5 through which clamping members in the form of elongated screws 6 extend. The screws 6 are each provided with a shouldered portion 7 on the front side of the gauge adjacent the side frame 1 and with a knurled manipulating hand portion 8. They are threaded as indicated at 9 at their end and are screwed into the side frame member 2 so that when the clamping members 6 are tightened, they will clamp all of the gauging members in place between the side frame bars.

The gauging members are thus all mounted for individual motion. The fit between the clamping screws or members 6 and the slots 5 is a loose fit to allow the gauging members to adjust themselves individually to the contour of the surface against which they are caused to contact as will be hereinafter described in greater detail. As the screws 6 also pass through the slots in each of the gauging members, they serve the additional function of preventing inadvertent removal of any gauging member from the assembly.

Means are provided for individually urging the gauging members outwardly. This means comprises a plurality of compression springs 10 which are seated at one end in notches 11, see Figure 7, formed in the portions 3 of the gauging members and which bear at their other ends against the overhanging portions 4 of succeeding gauging members.

In using the device all of the gauging members are moved inwardly to their greatest extent to the position shown in section in Figure 3 and the clamping members are tightened to thus lock the gauging members against motion. Thereafter the gauge is inserted in the space to be finally fitted with a liner and the clamping members are released. The springs 10 urge the gauging members outwardly against the opposed surfaces defining the space and each gauging member takes its individual position against the surface. Thereafter the clamping members are tightened, thus locking the gauging members against motion and the gauge is removed from the space. It is then adapted to be accurately calipered and a replica thereof made in the form of a liner so that the liner will accurately fit the space at which the gauging member was inserted. This process is repeated until the requisite number of liners has been made.

It will be seen that a very simple and serviceable type of gauge has been provided by this invention which may be very quickly manipulated to accurately gauge the space to be subsequently filled by a liner.

It will be seen further that the time required to fit liners to the spaces to be filled thereby is very much shortened by the use of this gauge.

Although this invention has been described in considerable detail, it is to be understood that such description is intended as illustrative rather than limiting, as the invention may be variously embodied and is to be interpreted as claimed.

I claim:

1. A gauge comprising a pair of side frames, a plurality of plate-like gauging members positioned between said side frames and mounted for individual translatory and rocking motion, a plurality of springs biasing said gauging members towards outward motion, and clamping means arranged at right angles to the planes of said gauging members for drawing said side frames towards each other to temporarily lock said gauging members against motion.

2. A gauge comprising a pair of side frames, a plurality of elongated plate-like gauging members positioned between said side frames and stacked with their elongated faces in contact and mounted for individual limited translatory and rocking motion, a plurality of springs biasing said gauging members towards outward motion, and clamping means for drawing said side frames towards each other to temporarily lock said gauging members against motion.

3. A gauge for gauging the distance between two spaced and opposed surfaces and adapted to be inserted in the space between said surfaces, said gauge comprising an assembly of a plurality of individually movable gauging members adapted to be individually projected outwardly from opposite sides of said assembly into contact with the surfaces whose spacing and contour are to be gauged, a plurality of springs urging said gauging members outwardly from opposite sides of said assembly, and clamping means for clamping said gauging members against motion.

4. A gauge comprising a pair of elongated side frames, a plurality of elongated gauging members arranged in a series of rows paralleling and positioned between said side frames, alternate gauging members being adapted to be projected from opposite sides of said gauge, there being a different number of gauging members in a row on one side than in a corresponding row on the other side, spring means biasing said gauging members outwardly, and clamping means for clamping said gauging members between said side frames.

5. A gauge comprising a pair of side frames, a plurality of gauging members positioned between said side frames and mounted for individual motion, said gauging members having overlapping portions provided with slots and alternate gauging members having gauging faces located on opposite sides of said gauge, springs urging said gauging members outwardly, and clamping means extending through the slots of said gauging members and adapted to draw said side frames towards each other to temporarily lock said gauging members against motion.

6. A gauge comprising a pair of elongated side frames, a plurality of elongated gauging members positioned between said side frames and mounted for individual motion, alternate gauging members having gauging faces on opposite sides of said gauge, the gauging faces on each side of said gauge being extended to provide a substantially continuous surface on each side of said gauge, a plurality of springs for urging said gauging members outwardly from opposite sides of said gauge, said gauging members having overlapping portions provided with elongated slots, and clamping screws extending from one side frame to the other through said elongated slots for preventing removal of the gauging members and for drawing said side frames towards each other to temporarily clamp said gauging members against motion.

7. A gauge comprising a pair of elongated side frames, a plurality of elongated gauging members arranged in a series or rows paralleling and positioned between said side frames, alternate gauging members being adapted to be projected from opposite sides of said gauge, spring means biasing said gauging members outwardly, and clamping means for clamping said gauging members between said side frames.

JOHN D. WEST.

REFERENCES CITED

The following references are of record in the file of this patent:

UNITED STATES PATENTS

| Number | Name | Date |
|---|---|---|
| 80,649 | Merrill | Aug. 4, 1868 |
| 1,364,534 | Walter | Jan. 4, 1921 |
| 2,230,143 | Hyland | Jan. 28, 1941 |

FOREIGN PATENTS

| Number | Country | Date |
|---|---|---|
| 281,493 | Germany | Jan. 7, 1915 |